US007373019B2

United States Patent
Zomet et al.

(10) Patent No.: US 7,373,019 B2
(45) Date of Patent: May 13, 2008

(54) SYSTEM AND METHOD FOR PROVIDING MULTI-SENSOR SUPER-RESOLUTION

(75) Inventors: Assaf Zomet, Karkur (IL); Shmuel Peleg, Karkur (IL)

(73) Assignee: Yissum Research Development, Jerusalem (IL)

( * ) Notice: Subject to any disclaimer, the term of this patent is extended or adjusted under 35 U.S.C. 154(b) by 0 days.

(21) Appl. No.: 11/607,869

(22) Filed: Dec. 4, 2006

(65) Prior Publication Data

US 2007/0133903 A1 Jun. 14, 2007

Related U.S. Application Data

(62) Division of application No. 10/307,265, filed on Nov. 30, 2002, now abandoned.

(60) Provisional application No. 60/338,726, filed on Nov. 30, 2001.

(51) Int. Cl.
*G06K 9/32* (2006.01)
(52) U.S. Cl. ...................................................... 382/299
(58) Field of Classification Search ................. 382/167, 382/276, 293, 298, 299
See application file for complete search history.

(56) References Cited

U.S. PATENT DOCUMENTS

| 4,683,496 | A | | 7/1987 | Tom |
| 5,767,987 | A | * | 6/1998 | Wolff et al. ................. 358/447 |
| 5,949,914 | A | | 9/1999 | Yuen |
| 6,434,280 | B1 | | 8/2002 | Peleg et al. |
| 6,614,930 | B1 | | 9/2003 | Agnihotri et al. |
| 6,618,503 | B2 | | 9/2003 | Hel-or et al. |
| 6,625,305 | B1 | | 9/2003 | Keren |
| 2002/0063807 | A1 | | 5/2002 | Margulis |

OTHER PUBLICATIONS

Baker, S. et al.; "Limits on Super-Resolution and How to Break Them;" Jun. 13-15, 2000; Proc. of Computer Vision and Pattern Recognition; Hilton Head; SC; vol. II; pp. 372-379.
Berthod, M. et al.; "Reconstruction of High Resolution 3D Visual Information;" 1994; IEEE Conf. on Computer Vision and Pattern Recognition; pp. 654-657.
Blomgrem, P. et al.; "Color TV: Total Variation Methods for Restoration of Vector-Valued Images;" Mar. 1998; IEEE Transactions on Image Processing; vol. 7, No. 3; pp. 304-309.

(Continued)

*Primary Examiner*—Colin LaRose
(74) *Attorney, Agent, or Firm*—Browdy and Neimark

(57) ABSTRACT

A super-resolution enhanced image generating system is described for generating a super-resolution-enhanced image from an image of a scene, identified as image $g_0$, comprising a base image and at least one other image $g_i$, the system comprising an initial super-resolution enhanced image generator, an image projector module and a super-resolution enhanced image estimate update generator module. The initial super-resolution enhanced image generator module is configured to use the image $g_0$ to generate a super-resolution enhanced image estimate. The image projector module is configured to selectively use a warping, a blurring and/or a decimation operator associated with the image $g_i$ to generate a projected super-resolution enhanced image estimate. The super-resolution enhanced image estimate update generator module is configured to use the input image $g_i$ and the super-resolution enhanced image estimate to generate an updated super-resolution enhanced image estimate.

18 Claims, 7 Drawing Sheets

OTHER PUBLICATIONS

Burt, P. J. et al.; "Enhanced Image Capture Through Fusion;" 1993; ICCV93; pp. 173-182.

Capel, D. et al.; "Super-resolution Enhancement of Text Image Sequences;" 2000; Int. Conf. Pattern Recognition; vol. I; pp. 600-605.

Elad, M. et al.; "Restoration of a Single Superresolution Image from Several Blurred, Noisy, and Undersampled Measured Images;" Dec. 1997; IEEE Transactions on Image Processing; vol. 6, No. 12; pp. 1646-1658.

Freeman, W. et al.; "Learning Low-Level Vision;" Sep. 21-24, 1999; Proc. of International Conference on Computer Vision; Corfu; Greece; pp. 1182-1189.

Funt, B. et al.; "Color from Black and White;" 1988; pp. 2-8.

Hertzmann, A. et al.; "Image Analogies;" Aug. 2001; ACM Siggraph 2001; pp. 327-340.

Irani, M. et al.; "Robust Multi-Sensor Image Alignment;" 1998; ICCV98; pp. 959-966.

Irani, M. et al.; "Improving Resolution by Image Registration;" May 1991; CVGIP: Graphical Models and Image Processing; vol. 53, No. 3; pp. 231-239.

Ishiguro, H. et al.; "Omni-Directional Stereo;" Feb. 1992; IEEE Transactions on Pattern Analysis and Machine Intelligence; vol. 14, No. 2; pp. 257-262.

Keren, D. et al.; "Restoring Subsampled Color Images;" 1999; Machine Vision and Applications; vol. 11, No. 4; pp. 197-202.

Kimmel, R.; "Demosaicing: Image Reconstruction from Color CCD Samples;" Sep. 1999; IEEE Transactions on Image Processing; vol. 8, No. 9; pp. 1221-1228.

Mann, S. et al.; "Virtual Bellows: Constructing High Quality Stills from Video;" Nov. 1994; M.I.T Media Laboratory Perceptual Computing Section Technical Report No. 259; Appears; Proc. First IEEE Int. Conf. on Image Processing; Austin; TX; pp. 1-5.

Patti, A. J. et al.; "Superresolution Video Reconstruction with Arbitrary Sampling Lattices and Nonzero Aperture Time;" Aug. 1997; IEEE Transactions on Image Processing; vol. 6, No. 8; pp. 1064-1076.

Schultz, R. R. et al.; "Stochastic Modeling and Estimation of Multispectral Image Data;" Aug. 1995; IEEE Transactions on Image Processing; vol. 4, No. 8; pp. 1109-1119.

Schultz, R. R. et al.; "Extraction of High-Resolution Frames from Video Sequences;" Jun. 1996; IEEE Transactions on Image Processing; vol. 5, No. 6; pp. 996-1011.

Shekarforoush, H. et al.; "Data-Driven Multichannel Superresolution with Application to Video Sequences;" Mar. 1999; Journal of the Optical Society of America; vol. 16, No. 3; pp. 481-492.

Tom, B. C. et al.; "Multi-Channel Image Identification and Restoration Using the Expectation-Maximization Algorithm;" 1994; pp. 1-33.

Viola, P. et al.; "Alignment by Maximization of Mutual Information;" Sep. 1997; International Journal of Computer Vision; vol. 24, No. 2; pp. 137-154.

Zomet, A. et al.; "Efficient Super-Resolution and Applications to Mosaics;" 2000; ICPR00; vol. I; pp. 579-583.

* cited by examiner

SYSTEM AND METHOD FOR PROVIDING MULTI-SENSOR SUPER-RESOLUTION

FIELD OF THE INVENTION

The invention is generally related to the field of image processing of images, and more particularly to systems for enhancing the resolution of images. The invention is specifically directed to a system and method of generating an enhanced super-resolution image of a scene from a plurality of input images of the scene that may have been recorded with different image recording sensors.

BACKGROUND OF THE INVENTION

An image of a scene as recorded by camera is recorded at a particular resolution, which depends on the particular image recording medium or sensor that is used to record the image. Using one of a number of so-called "super resolution enhancement" methodologies, an image of enhanced resolution can be generated from a plurality of input images of the scene. A number of super-resolution enhancement methodologies assume that the images are recorded by the same sensor. However, in many applications, images of a scene will typically be recorded using different image recording sensors. For example, a color image of a scene is recorded by an image recording medium that actually comprises three different sensors, one sensor for each of the red, blue and green primary colors. A problem arises in such applications, since conventional super-resolution-enhancement methodologies can only be applied on multiple images generated by a similar sensor.

SUMMARY OF THE INVENTION

The invention provides a new and improved system and method of generating a super-enhanced resolution image of a scene from a plurality of input images of a scene that may have been recorded with different image recording sensors.

In brief summary, the invention provides a super-resolution enhanced image generating system for generating a super-resolution-enhanced image from an image of a scene, identified as image $g_0$, comprising a base image and at least one other image $g_i$, the system comprising an initial super-resolution enhanced image generator, an image projector module and a super-resolution enhanced image estimate update generator module. The initial super-resolution enhanced image generator module is configured to use the image $g_0$ to generate a super-resolution enhanced image estimate. The image projector module is configured to selectively use a warping, a blurring and/or a decimation operator associated with the image $g_i$ to generate a projected super-resolution enhanced image estimate. The super-resolution enhanced image estimate update generator module is configured to use the input image $g_i$ and the super-resolution enhanced image estimate to generate an updated super-resolution enhanced image estimate.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
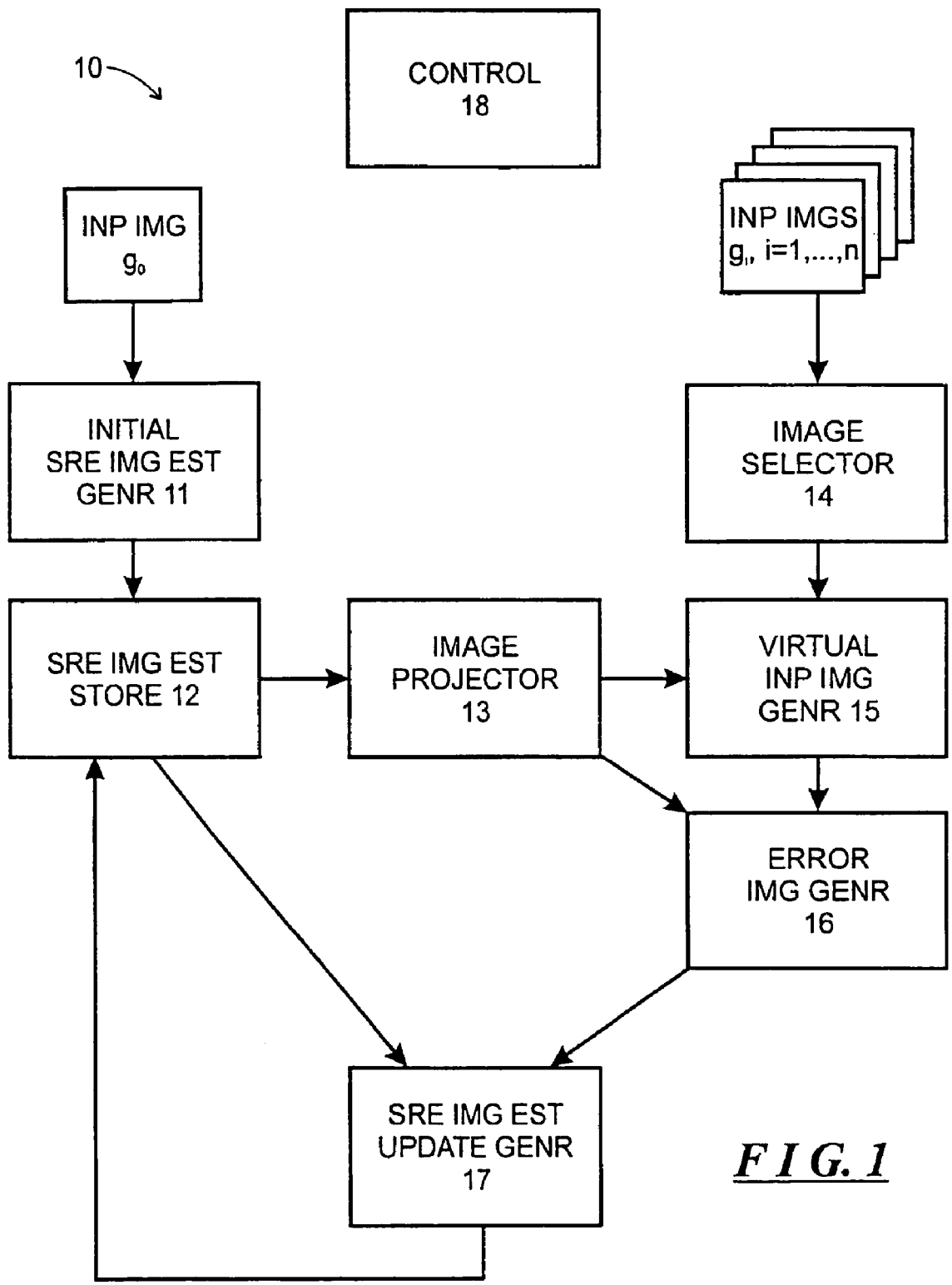
FIG. 1 is a functional block diagram of a super-resolution enhanced image generating system for generating a super-enhanced resolution image of a scene from a plurality of input images of a scene that may have been recorded with different image recording sensors, constructed in accordance with the invention.

FIG. 1 is a functional block diagram of a super-resolution enhanced image generating system 10 for generating a super-enhanced resolution image of a scene from a plurality of input images of a scene that may have been recorded with different image recording sensors, constructed in accordance with the invention. With reference to FIG. 1, the super-resolution enhanced image generating system 10 includes an initial super-resolution enhanced image estimate generator 11, an super-resolution enhanced image estimate store 12, an image projector 13, an input image selector 14, a virtual input image generator 15, an error image generator 16, and a super-resolution enhanced image update generator 17, all under control of a control module 18. Under control of the control module 18, the super-resolution enhanced image estimate generator 11 receives a base input image "$g_0$" of a scene and generates an initial estimate for the super-resolution enhanced image to be generated, which it stores in the super-resolution enhanced image estimate store 12.

Also under control of the control module 18, the image selector selects one of a plurality of other input images $\{g^i\}_{i=1}^n$ of the scene, which may have been recorded by another sensor.

Thereafter, the control module 18 enables the image projector 13 to generate a projected image of the super-resolution enhanced image estimate image in the super-resolution enhanced image estimate store, in this case using the imaging model for the image recording sensor that had been used to record the selected input image $g_i$. The projected super-resolution enhanced image estimate and the selected input image are both coupled to the virtual input image generator 15. The virtual input image generator 15 receives the projected super-resolution enhanced image estimate as generated by the image projector 13 and the selected input image $g_i$, $i \geq 1$, and performs two operations. First, for each pixel in corresponding locations in the projected image estimate and the selected input image, the virtual input image generator 15 generates a normalized cross-correlation value in a neighborhood of the respective pixel, and determines whether the normalized cross-correlation value is above a selected threshold value. The normalized cross-correlation value is an indication of the affine similarity between the intensity of the projected image and the intensity of the selected input image, that is, the degree to which a feature, such as an edge, that appears near the particular location in the projected image images is also near the same location in the selected input image. If the normalized cross-correlation value is above the threshold, the virtual input image generator generates affine parameters using a least-squares estimate for the affine similarity in the window, and uses those affine parameters, along with the pixel value (which represents the intensity) at the location in the selected input image to generate a pixel value for the location in the virtual input image. On the other hand, if the normalized cross-correction value is below the threshold, the virtual input image generator 15 assigns the location in the virtual input image the pixel value at that location in the projected image. The virtual image generator 15 performs these operations for each of the pixels in the projected image as generated by the image projector 13 and the selected input image $g_i$, $i \geq 1$, thereby to generate the virtual input image.

The error image generator 16 receives the projected image as generated by the image projector 13 and the virtual input image as generated by the virtual input image generator 15 and generates an error image that reflects the difference in pixel values as between the two images. The super-resolution enhanced image estimate update generator 17 receives the error image as generated by the error image generator 16 and the super-resolution enhanced image estimate store 12 and generates an updated super-resolution enhanced image estimate, which is stored in the super-resolution enhanced image estimate store 12.

If there is another input image $\{g_i\}_{i=1}^n$, after the updated super-resolution enhanced image estimate has been stored in the store 12, the control module can enable the various modules 13-17 to repeat the operations described above in connection with another input image. These operations can be repeated for each of the input images. After all, or a selected subset, of the input images $\{g_i\}_{i=1}^n$ have been selected and used as described above, the control module 18 can terminate processing, at which point the image in the super-resolution enhanced image estimate store 12 will comprise the super-resolution enhanced image. Alternatively, or in addition, the control module 18 can enable the operations in connection with the input images $\{g_i\}_{i=1}^n$, or the selected subset, through one or more subsequent iterations to further enhance the resolution of the image in the super-resolution enhanced image estimate store 12.

Details of the operations performed by the initial super-resolution enhanced image estimate generator 11, the image projector 13, the virtual input image generator 16, the error image generator 16 and the super-resolution enhanced image estimate update generator 17 will be described below.

By way of background, a super-resolution enhanced image of a scene is typically generated from a set $\{g_i\}_{i=1}^n$ of "n" input images of a scene, all of which have been recorded by the same image recording sensor. The input images are indexed using index "i." It will be assumed that all of the images are the result of imaging a high-resolution image f of a scene, which high-resolution image initially is unknown. The imaging model, which models the various recorded images $g_i$, usually includes one or more of a plurality of components, the components including a geometric warp, camera blur, decimation, and added noise. The goal is to find a high-resolution image f that, when imaged into the lattice of the input images according to the imaging model, provides a good prediction for the low-resolution images $g_i$. If $\hat{f}$ is an estimate of the unknown image f, a prediction error image "$d_i$" for the estimate $\hat{f}$ is given by $$d_i = g_i - B_i(W_i(\hat{f})) \downarrow \qquad (1)$$

where "$W_i$" is an operator that represents geometric warping as between the "i-th" input image $g_i$ and the estimate $\hat{f}$ of the unknown image f, "$B_i$" is an operator that represents the blurring as between the "i-th" input image $g_i$ and the estimate $\hat{f}$ of the unknown image f, and "$\downarrow$" represents decimation, that is, the reduction in resolution of the estimate $\hat{f}$ of the unknown image f to the resolution of the "i-th" input image $g_i$. The blurring operator "$B_i$" represents all of the possible sources of blurring, including blurring that may be due to the camera's optical properties, blurring that may be due to the camera's image recording sensor, and blurring that may be due to motion of the camera and/or objects in the scene while the camera's shutter is open. The warping operator "$W_i$" represents the displacement or motion of points in the scene as between the respective "i-th" input image "$g_i$" and the estimate $\hat{f}$. An example of the motion that is represented by the warping function "$W_i$" is the displacement of a projection of a point in the scene from a pixel having coordinates $(x_i, y_i)$ in an image $g_i$ to a pixel having coordinates $(x_i', y_i')$ in the estimate $\hat{f}$. It will be appreciated that the information defining the respective input images are in the form of arrays, as are various operators. It will also be appreciated that the arrays comprising the various operators will generally be different for each of the "i" input images $g_i$. Typically, super-resolution image generating systems determine the estimate $\hat{f}$ of the unknown image f by minimizing the norm of the prediction error image $d_i$ (equation (1)) as among all of the input images $g_i$.

The super-resolution image generating systems described in connection with equation (1) generate a super-resolution enhanced image from a plurality of input images $\{g_i\}_{i=1}^n$, all of which were recorded by the same image recording sensor. The super-resolution enhanced image generating system in accordance with the invention generates a super-enhanced image from a set of input images, which need not have been recorded using the same image recording sensor. More specifically, the super-resolution enhanced image generating system generates an estimate $\hat{f}$ of a high-resolution version of a base image "$g_0$" of a scene using that image "$g_0$" and a set $\{g_i\}_{i=1}^n$ of other input images of the scene. The base image $g_0$ and the other input images $\{g_i\}_{i=1}^n$ may, but need not, have been recorded using different image recording sensors; that is, no assumption is made that the image recording sensors that were used to record the input images $\{g_i\}_{i=1}^n$ are similar to each other, or to the sensor that was used to record the base image "$g_0$." The super-resolution enhanced image generating system 10 can generate an initial estimate from the base image $g_0$ using any of a number of methodologies as will be apparent to those skilled in the art; one methodology that is useful in connection with one particular application will be described below.

The super-resolution enhanced image generating system makes use of an observation that aligned images as recorded by different image recording sensors are often statistically related. The super-resolution enhanced image generating system makes use of a statistical model "M" that relates a projected image $p_i = B_i(W_i(\hat{f})) \downarrow$ to the respective input image "$g_i$" as recorded by the image recording sensor. In that case, a virtual input image $\hat{g}_i$ can be defined as $$\hat{g}_i = M(p_i, g_i) \qquad (2)$$

For the projected image $p_i = B_i(W_i(\hat{f})) \downarrow$, $\hat{f}$ is the current estimate of the super-resolution enhanced image, and, as described above, "$B_i$," "$W_i$" and "$\downarrow$" represent the blurring, warping and decimation operators, respectively, for the respective "i-th" input image, $i \geq 1$.

After the respective projected image $p_i$ and the virtual input image $\hat{g}_i$ for a particular input image $g_i$ have been generated, a virtual prediction error image "$v_i$" can be generated as $$v_i = \hat{g}_i - p_i \qquad (3)$$

Thereafter, the super-resolution enhanced image generating system uses the virtual prediction error image "$v_i$" from equation (3) in generating the super-resolution enhanced image in a manner similar to that described above in connection with equation (1), but using the virtual prediction error image $v_i$ instead of the prediction error image $d_i$.

The super-resolution enhanced image generating system makes use of a statistical model M that is based on a local photometric affine alignment as between the intensities of the input images $\{g_i\}_{i=1}^n$ and the intensities of the projected images. In particular, the super-resolution enhanced image generating system makes use of small corresponding pixel neighborhoods in the projected image $p_i$ and the associated input image $g_i$ and generates estimates for an affine transformation relating the intensity values of the image $p_i$ to the intensity values of the respective input image $g_i$, that is $p_i(x,y)=a(x,y)g_i(x,y)+b(x,y)$, where (x,y) represents the location of the respective pixel. (In the following discussion, the use of "(x,y)" may be dropped for clarity.) The super-resolution enhanced image generating system then uses the mapping to generate the respective virtual input image as $$\hat{g}_i(x,y)=a(x,y)g_i(x,y)+b(x,y) \quad (4),$$

and the prediction error image $v_i$ as described above in connection with equation (3). Under the assumption that the input image is contaminated with zero-mean white noise, which typically is the case, the optimal estimation for the affine relation between each projected image $p_i$ and the respective input image $g_i$ provides coefficients "a" and "b" such as to minimize $$\min_{(a,b)} \sum_{u,v} (ag_i(u,v)+b-p_i(u,v))^2, \quad (5)$$

where "u" and "v" define a small neighborhood R around each of the respective pixels (x,y).

The super-resolution enhanced image generating system generates the pixel value (intensity) for a pixel at location (x,y) in the virtual input image $\hat{g}_i=M(p_i,g_i)$ (reference equation (3)) as follows. Initially, the super-resolution enhanced image generating system generates an estimate "c(x,y)" of a centralized and normalized cross-correlation in a weighted window of size "2k+1" by "2k+1," for a selected value of "k," around the respective pixel at location (x,y) as follows:

$$c(x,y) = \frac{\overline{p_i g_i}(x,y) - \overline{p_i}(x,y)\overline{g_i}(x,y)}{\sqrt{(\overline{p_i^2}(x,y) - (\overline{p_i}(x,y))^2)(\overline{g_i^2}(x,y) - (\overline{g_i}(x,y))^2)}}. \quad (6)$$

where $\overline{p_i}(x,y)$, $\overline{g_i}(x,y)$, $\overline{p_i g_i}(x,y)$, $\overline{p_i^2}(x,y)$, and $\overline{g_i^2}(x,y)$ are weighted averages around the pixel at coordinates (x,y) in the respective image $p_i$ or $g_i$. That is, for example, $$\overline{p_i}(x,y) = \sum_{-k \leq u,v \leq k} w(u,v) p_i(x+u, y+v) \quad (7)$$

$$\overline{p_i g_i}(x,y) = \sum_{-k \leq u,v \leq k} w(u,v) p_i(x+u, y+v) g_i(x+u, y+v)$$

$$\overline{p_i^2}(x,y) = \sum_{-k \leq u,v \leq k} w(u,v)(p_i(x+u, y+v))^2,$$

where "w(u,v)" is a weighting kernel. In one embodiment, the values selected for the weighting kernel decrease with increasing absolute values of "u" and "v," so that less weight will be given in the weighted sums to values of pixels in the window with increasing distance from the pixel at location (x,y), thereby to provide for a reduction in spatial discontinuities in the affine parameters "a" and "b" (equation (4)).

After the super-resolution enhanced image generating system has generated the cross-correlation estimate c(x,y) of the cross-correlation for a pixel at location (x,y), it compares the absolute value of the cross-correlation estimate c(x,y) to a threshold value "T." If the super-resolution enhanced image generating system determines that the absolute value of the cross-correlation estimate c(x,y) is less than the threshold value "T," the value of the pixel at location (x,y) in the virtual input image $\hat{g}_i$ is set to correspond to the value of the pixel at location (x,y) in the projected image $p_i$, that is, $\hat{g}_i(x,y)=p_i(x,y)$.

On the other hand, if the super-resolution enhanced image generating system determines that the absolute value of the estimate c(x,y) is greater than or equal to the threshold value "T," it generates coefficients "a" and "b" for use in generating the least-squares estimate for the affine similarity in the window around the pixel at location (x,y) as follows $$\begin{bmatrix} a \\ b \end{bmatrix} = \begin{bmatrix} \overline{p_i^2}(x,y) & \overline{p_i}(x,y) \\ \overline{p_i}(x,y) & 1 \end{bmatrix}^{-1} \begin{bmatrix} \overline{p_i g_i}(x,y) \\ \overline{g_i}(x,y) \end{bmatrix} \quad (8)$$

and then generates the pixel value for the pixel in location (x,y) of the virtual input image as $$\hat{g}_i(x,y)=a \, g_i(x,y)+b \quad (9),$$

(compare equation (4)) where "a" and "b" in equation (9) are as determined from equation (8). The super-resolution enhanced image generating system performs the operations described above in connection with equations (6) through (9) for each of the pixels that are to comprise part of the respective virtual input image $\hat{g}_i$. After the super-resolution enhanced image generating system has completed the respective virtual input image $\hat{g}_i$, it generates the value for the virtual prediction error image $v_i$ using equation (3). After the super-resolution enhanced image generating system has generated the virtual prediction error image $v_i$, it will use the virtual prediction error image to update the estimate f̂ of the unknown image f. The super-resolution enhanced image generating system can repeat these operations for each of the input images $\{g_i\}_{i=1}^n$ to update the estimate f̂. In addition, the super-resolution enhanced image generating system can repeat the operations with the some or all of the input images $\{g_i\}_{i=1}^n$, and possibly also the base input image $g_0$, through one or more subsequent iterations to further update the super-resolution enhanced image estimate f̂.

Figure 2:
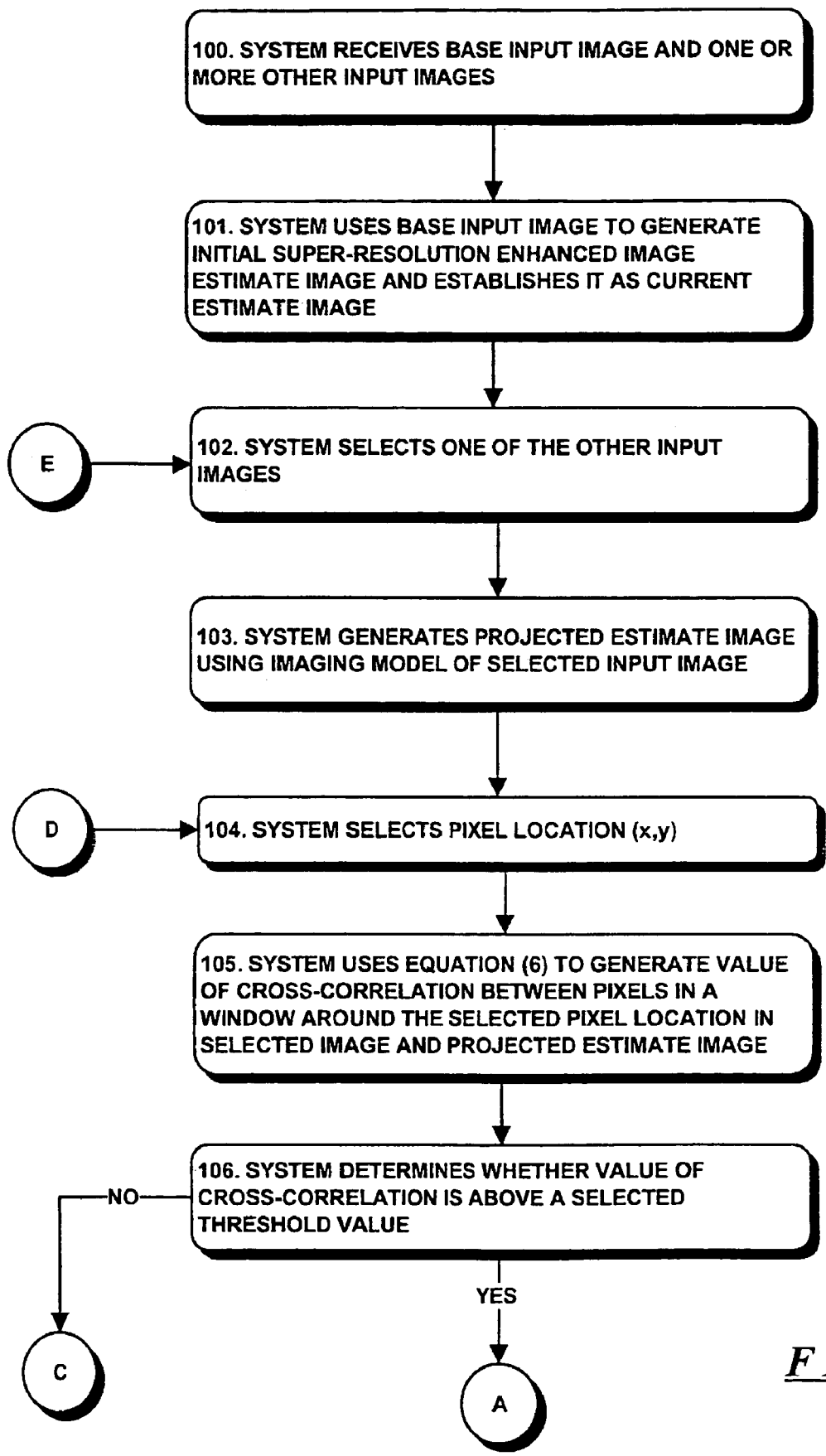
FIG. 2 is a flow chart depicting operations performed by the super-resolution enhanced image generating system depicted in FIG. 1.
Figure 2A:
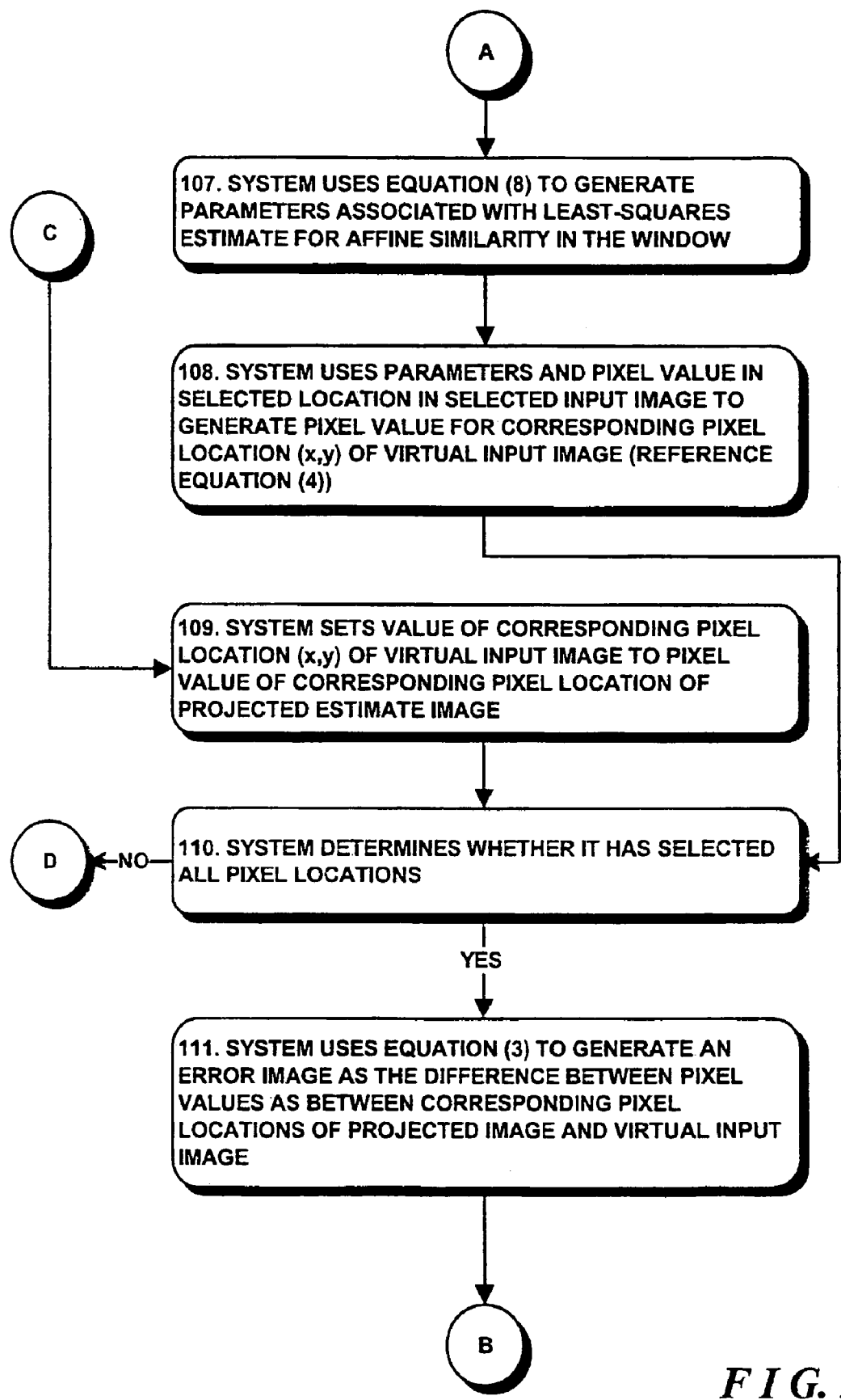
Figure 2B:
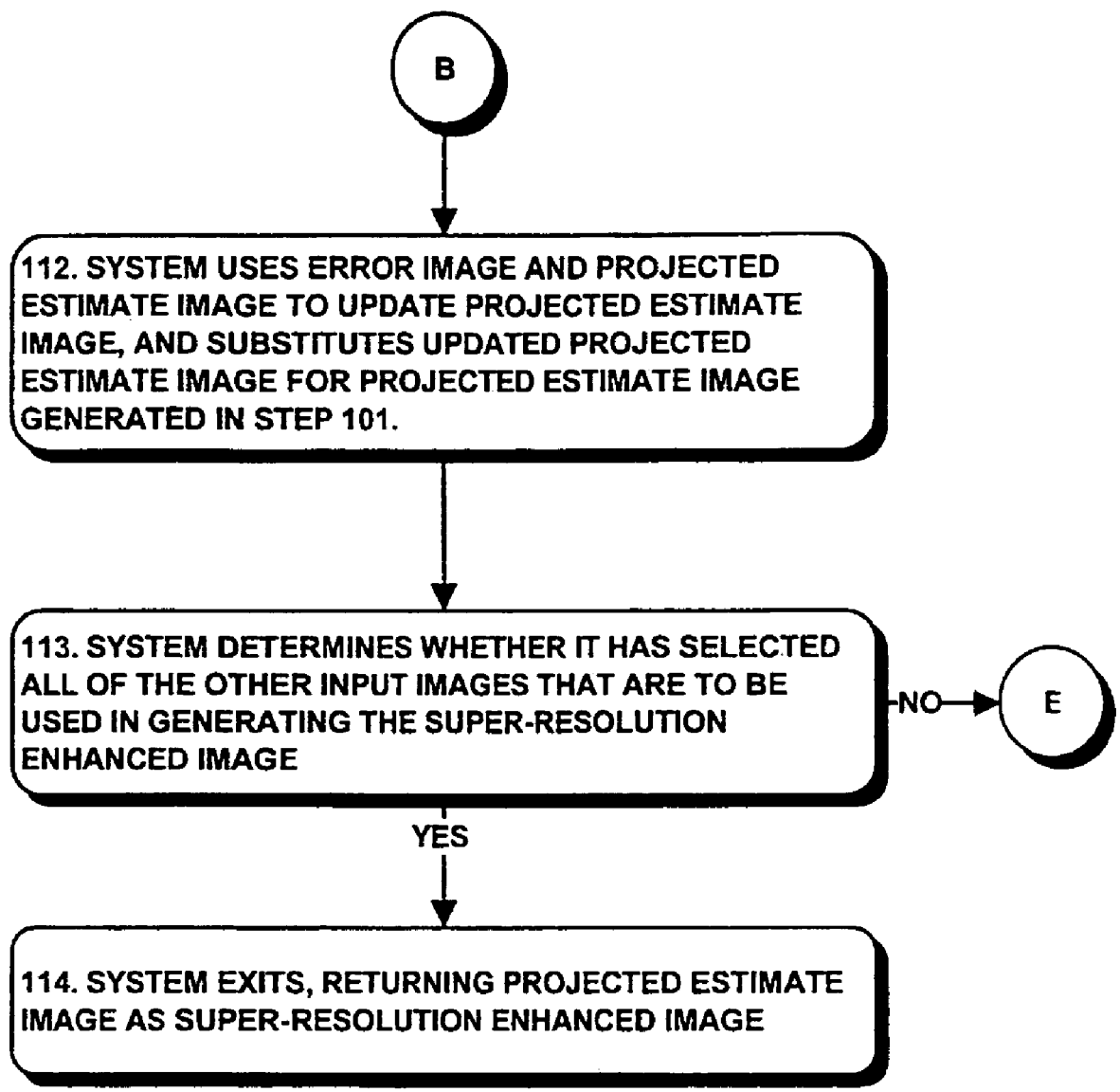

FIG. 2 depicts a flow chart outlining operations that are performed by the super-resolution enhanced image generating system 10 as described above in connection with FIG. 1 and equations (2) through (9) in connection with generating and updating the a super-resolution enhanced image estimate f̂. The operations will be apparent to those skilled in the art with reference to the above discussion, and so the various steps outlined in the flow chart will not be described in detail herein In one embodiment, the super-resolution enhanced image generating system 10 is used in connection with demosaicing images that are associated with respective color channels of a CCD (charge coupled device) array that may be used in, for example a digital camera. Typically, a CCD array has a plurality of individual light sensor elements that are arranged in a plurality of rows and columns, with each light sensor element detecting the intensity of light of a particular color incident over the respective element's surface. Each sensor element is associated with a pixel in the image, and identifies the degree of brightness of the color associated with that pixel. The sensor element performs the operation of integrating the intensity of light incident over the sensor element's area over a particular period of time, as described above.

For a CCD array that is to be used in connection with the visual portion of the electromagnetic spectrum, each two-by-two block of four light sensor elements comprises light sensor elements that are to sense light of all three primary colors, namely, green red and blue. In each two-by-two block, two light sensor elements are provided to sense light of color green, one light sensor element is provided to sense light of color red and one light sensor element is provided to sense light of color blue. Typically, the two light sensor elements that are to be used to sense light of color green are along a diagonal of the two-by-two block and the other two light sensor elements are along the diagonal orthogonal thereto. In a typical CCD array, the green light sensor elements are at the upper right and lower left of the block, the red light sensor element is at the upper left and the blue light sensor element is at the lower right. It will be appreciated that the collection of sensor elements of each color provides an image of the respective color, with the additional proviso that the two green sensor elements in the respective blocks define two separate input images. In that case, if, for example, the CCD array has "m" rows-by-"n" columns, with a total resolution of m*n (where "*" represents multiplication), the image that is provided by the respective sets of green sensors in the respective blocks will have a resolution of ¼*m*n, and the image that is provided by each of the red and blue sensors will have a resolution of ¼*m*n. In the demosaicing operation, the super-resolution enhanced image generating system generates a super-resolution enhanced image associated with each color channel, using information from the image that is associated with the respective color channel as well as the images that are associated with the other colors as input images. In this connection, the collection of light sensor elements of the CCD array that is associated with each of the colors is a respective "image recording sensor" for purposes of the super-resolution enhanced image generating system, so that there will be four image recording sensors and four input images, with one input image being associated with each of the image recording sensors. The super-resolution enhanced image that is generated by the super-resolution enhanced image generating system for each of the color channels will have a resolution of m-by-n. The super-resolution enhanced images generated for the various color channels by the super-resolution enhanced image generating arrangement can then be used in generating a composite color image of higher resolution than the original image provided by the CCD array.

In the demosaicing operation, the super-resolution enhanced image generating system actually generates four super-resolution enhanced images, one super-resolution enhanced image for each of the red and blue color channels, and two for the green color channel. For each super-resolution enhanced image, and with reference to the discussion above in connection with equations 3 through 12, the base input image $g_0$ is the image provided by the collection of light sensor elements associated with the respective color channel (with the two green light sensors in the respective blocks representing different color channels), and the other input images $\{g_i\}_{i=1}^n$ (in this case, n=3) will be provided by the collection of light sensor elements associated with the other three color channels, with the proviso, noted above, that the sensor elements in the respective blocks that are associated with the green color define separate channels for the demosaicing operation. For example, for the green channels, the base images $g_0$ are the images that are provided by the green light sensor elements of the respective positions in the blocks comprising the CCD array, and the red and blue input images $\{g_i\}_{i=1}^n$ will be provided by the collection of light sensor elements in the respective blocks that are associated with the red and blue channels. Similarly with base image and other input images associated with each of the other color channels.

After the super-resolution enhanced image generating system receives the four input images, it first uses the input images associated with the respective color channels to generate, for each color channel, an initial estimate $\hat{f}$ of the super-resolution enhanced image f for the respective color channel. Accordingly, the super-resolution enhanced image generating system uses the input image that is associated with the one of the green channels as the base image from which it generates the initial estimate $\hat{f}$ of the super-resolution enhanced image f that is associated with that green color channel, and similarly for the other color channels. In one embodiment, for each of the red and blue color channels, as well as the other green color channel, the super-resolution enhanced image generating system uses a linear interpolation as between points for the respective color channel in the array to provide initial pixel values for the array positions that are not provided by the CCD array. As mentioned above, the CCD array, in each two-by-two block of light sensor elements, one red light sensor element is provided at the upper left of the block. For the initial estimate $\hat{f}$ for the super-resolution enhanced image that is associated with the red channel, the red light sensor element in each block will provide the red channel pixel value that is associated with that pixel in the image that is associated with the red light sensor element. The super-resolution enhanced image generating system will generate red channel pixel values for the pixels that are associated with other three points in the block for which red light sensor elements are not provided by interpolating between the pixel values provided by red light sensor elements in neighboring blocks. The super-resolution enhanced image generating system generates the blue channel pixel values and the other blue channel pixel values for the pixels that are associated with the three points in the block for which blue light sensor elements are not provided in a similar manner.

As noted above, two green light sensor elements are provided in each block, one at the upper right and one at the lower left. In one embodiment, the super-resolution enhanced image generating system also uses a linear interpolation for the points in the block for which green light sensor elements are not provided. However, in this case, the super-resolution enhanced image generating system will select one of the green light sensor elements in each block, and perform a linear interpolation between pixel values provided by the selected green light sensor element and one of the green light sensor elements in adjacent blocks. For example, if the super-resolution enhanced image generating system makes use of the green light sensor element at the upper right of a block, in generating the pixel value for the point associated with the upper left of the same block, the super-resolution enhanced image generating system makes use of the pixel value generated by the green light sensor elements of that block and of the block to the left. In that case, in generating the pixel value for the point associated with the lower right of the same block, the super-resolution enhanced image generating system makes use of the pixel value generated by the green light sensor elements of that block and of the adjacent block down the array. In that embodiment, the super-resolution enhanced image generating system will not use the pixel value generated by the other green light sensor element in the block, in this example, the green light sensor element at the lower left corner of the block. Generating the initial estimate f̂ for the green channel in this manner results in a smooth initial estimate with satisfactory properties in connection with convergence to a result associated with the green color channel having desirable characteristics. On the other hand, if pixel values provided by both of the green light sensor elements in a block were to be used, the result associated with the green color channel may maintain some of the artifacts from the initial estimate f̂.

After the super-resolution enhanced image generating system has generated the initial estimate f̂ for the respective color channels, it will project the initial estimate f̂ that had been generated for the respective color channel back onto the input image for that color channel, thereby to generate the projected estimate image $p_0$ for the respective color channel. The super-resolution enhanced image generating system performs that operation, by convolving the initial estimate f̂ with the PSF function for the CCD array that generated the input image for the respective color channel. The super-resolution enhanced image generating system can then, for each color channel, use the projected image for the respective color channel, and the input images associated with the other channels to update the initial estimate f̂ so as to provide the final super-resolution enhanced image for the respective color channel.

For clarity, the following description will be of operations that are performed by the super-resolution enhanced image generating system to generate a super-resolution enhanced image for one of the color channels. It will be appreciated that the super-resolution enhanced image generating system can generate a super-resolution enhanced image for each of the color channels in the same way. It will further be appreciated that the super-resolution enhanced image generating system can perform the operations to generate a super-resolution enhanced image for each color channel consecutively, or it can perform the individual steps for the various color channels on an overlapped basis.

After the super-resolution enhanced image generating system has projected the initial estimate f̂ generated for a color channel back onto the input image for that color channel, thereby to generate a projected estimate image $p_0$ for the color channel, it will select one of the other color channels whose input image $g_i$ will be used to update the initial estimate f̂. For example, if the super-resolution enhanced image generating system is generating a super-resolution enhanced image for the green color channel, it will select one of the red or blue color channel whose associated the input image will be used in updating the initial estimate f̂ for the green color channel. After the super-resolution enhanced image generating system has updated the initial estimate using the input image associated with the color channel that it first selected, it will select the other of the red or blue color channel, whose input image will be used in further updating the updated estimate f̂, thereby to generate the final super-resolution enhanced image. For example, if the super-resolution enhanced image generating system first selects the red channel, after it has updated the initial estimate f̂ using the input image associated with the red channel, it will select the blue channel and use its input image to further update the estimate, thereby to generate the final super-resolution enhanced image.

After the super-resolution enhanced image generating system has selected a color channel whose input image $g_i$ will be used to update the initial estimate f̂, it will generate and initialize an array data structure that will be used to receive values defining for the virtual error image $v_i$. The super-resolution enhanced image generating system will initialize the array data structure to have number of array elements organized in rows and columns, the array having the same structure as the arrays for the various input images and the super-resolution enhanced image. The super-resolution enhanced image generating system initializes the values of the array elements to a predetermined number, which, in one embodiment, is selected to be zero.

After the super-resolution enhanced image generating system has initialized an array data structure to be used for the virtual error image $v_i$, it will perform a number of steps to generate an error image v for the selected color channel. In that operation, the super-resolution enhanced image generating system initially divides both the projected input image p and the input image g for the selected color channel into four sub-images $p_{ij}$ and $g_{ij}$ (i=0, 1) (here the subscripts are used to identify the particular sub-image). In dividing each of the images p and g into a sub-image, the pixel value corresponding to the pixel at location (q,r) of the respective image p, g provides the pixel value for the pixel at location (x,y) in the respective sub-image $p_{ij}$, $g_{ij}$ such that (q,r)=(2x+i,2y+j).

After the super-resolution enhanced image generating system has generated the various sub-images $p_{ij}$ and $g_{ij}$, it will, for each pixel at location (x,y) in the respective sub-image, generate the weighted averages $\overline{p_{ij}}(x,y)$, $\overline{g_{ij}}(x,y)$, $\overline{p_{ij}g_{ij}}(x,y)$, $\overline{p_{ij}^2}(x,y)$, and $\overline{g_{ij}^2}(x,y)$ in a manner described above in connection with equation (7). Thereafter, for each pixel at location (x,y) in the respective sub-images $p_{ij}$ and $c_{ij}$, the super-resolution enhanced image generating system generates the centralized and normalized cross-correlation $c_{ij}(x,y)$ and determines whether the value of $c_{ij}(x,y)$ is greater than the threshold value T. If the super-resolution enhanced image generating system determines that the value of $c_{ij}(x,y)$ is greater than the threshold value T, it will generate values for "a" and "b" as described above in connection with equation (8) and set the value of the element at location (2x+i,2y+j) of the data structure established for the error image to $$v(2x+i,2y+j)=a\ g_{ij}(x,y)+b-p_{ij}(x,y) \qquad (10).$$

It will be appreciated that, in equation (16), "a $g_{ij}(x,y)$+b" corresponds to the pixel value of the pixel at location (x,y) of the virtual input image ĝ as described above in connection with equation (4) and so equation (16) corresponds to equation (3) above.

It will be appreciated that, since, the super-resolution enhanced image generating system makes use of equation (16) only if the value of the cross-correlation $c_{ij}$ is greater than the threshold value, for those locations for which the value of the cross-correlation is not greater than the threshold value, the value in the element of the data structure for established for the error image will remain zero, which is the desired result since, as noted above, if the value of the cross-correlation $c_{ij}$ for particular location (x,y) is less than or equal to the threshold value, the pixel at that location in the virtual input image is assigned the value of the pixel of the projected image at that location.

The super-resolution enhanced image generating system performs the operations described above for all of the pixels at locations (x,y) of the all of the respective sub-images $p_{ij}$ and $g_{ij}$ to populate the array provided for the error image v. Thereafter, the super-resolution enhanced image generating system uses the pixel values comprising the array for the error image v to update the initial estimate $\hat{f}$. In that operation, the super-resolution enhanced image generating system initially performs a convolution operation to convolve the error image v with the PSF function. Thereafter, the super-resolution enhanced image generating system can multiply the convolved error image with a sharpness parameter, and will add the result to the initial estimate $\hat{f}$, thereby to provide the estimate as updated for the selected color channel. In one embodiment, the value of the sharpness parameter is selected to be between "one" and "two," although it will be appreciated that other values may be selected.

After the super-resolution enhanced image generating system has generated the estimate as updated for the selected color channel, it can select the other color channel and perform the operations described above to further update the estimate and provide the final super-resolution enhanced image. As noted above, the super-resolution enhanced image generating system can also perform the same operations to generate a super-resolution enhanced image for each of the color channels.

Figure 3:
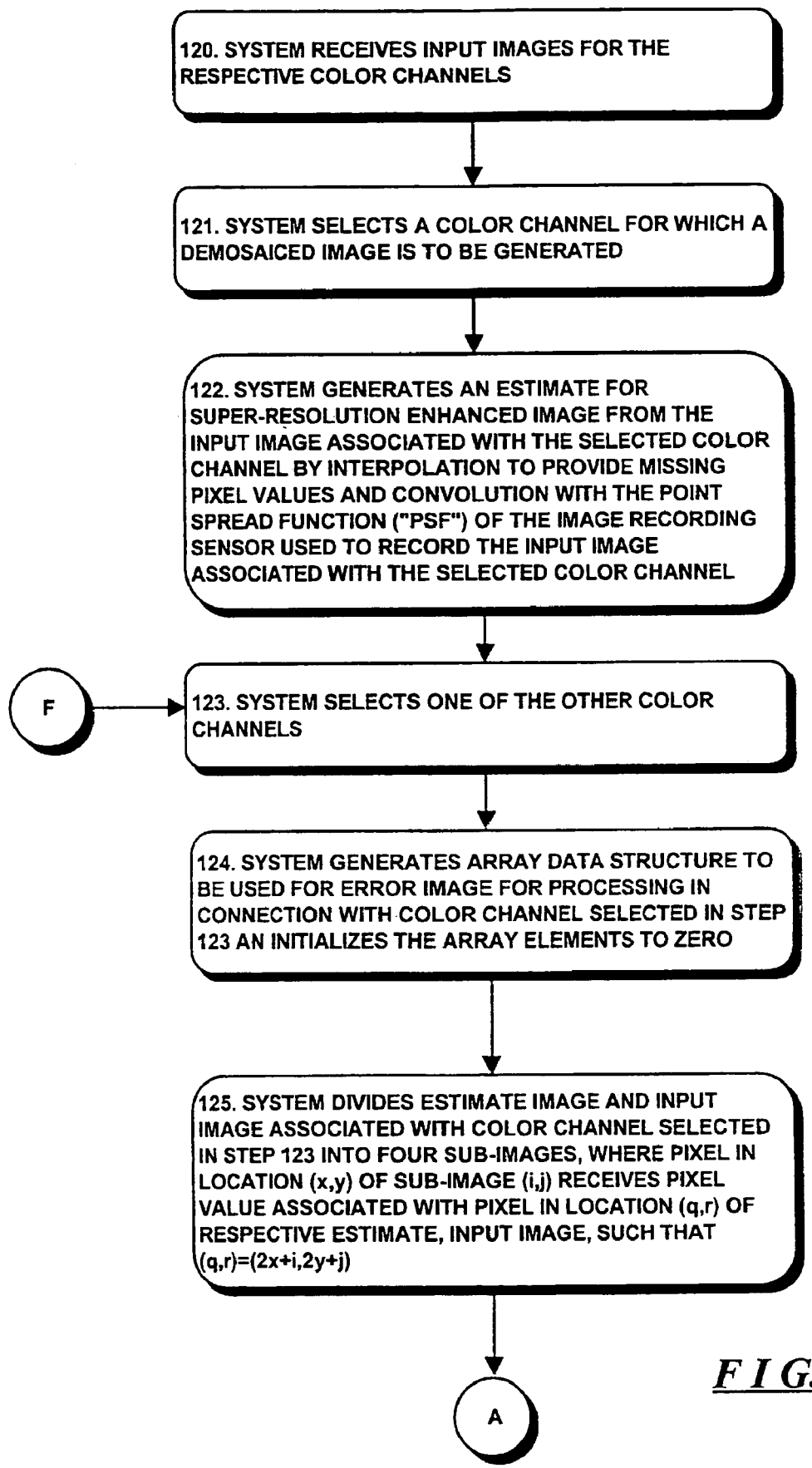
FIG. 3 is a flow chart depicting operations performed by the super-resolution enhanced image generating system in connection with a demosaicing operation.
Figure 3A:
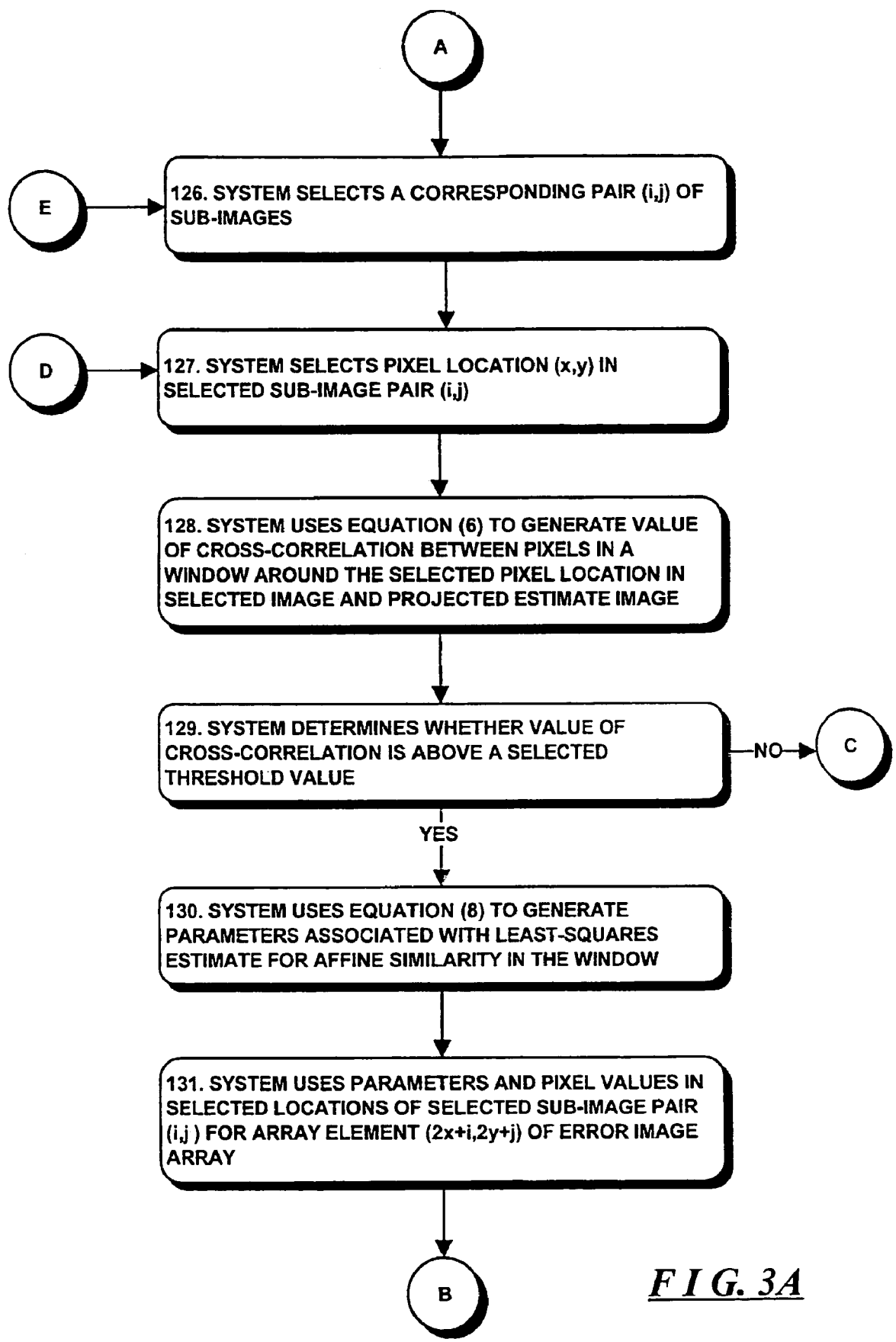
Figure 3B:
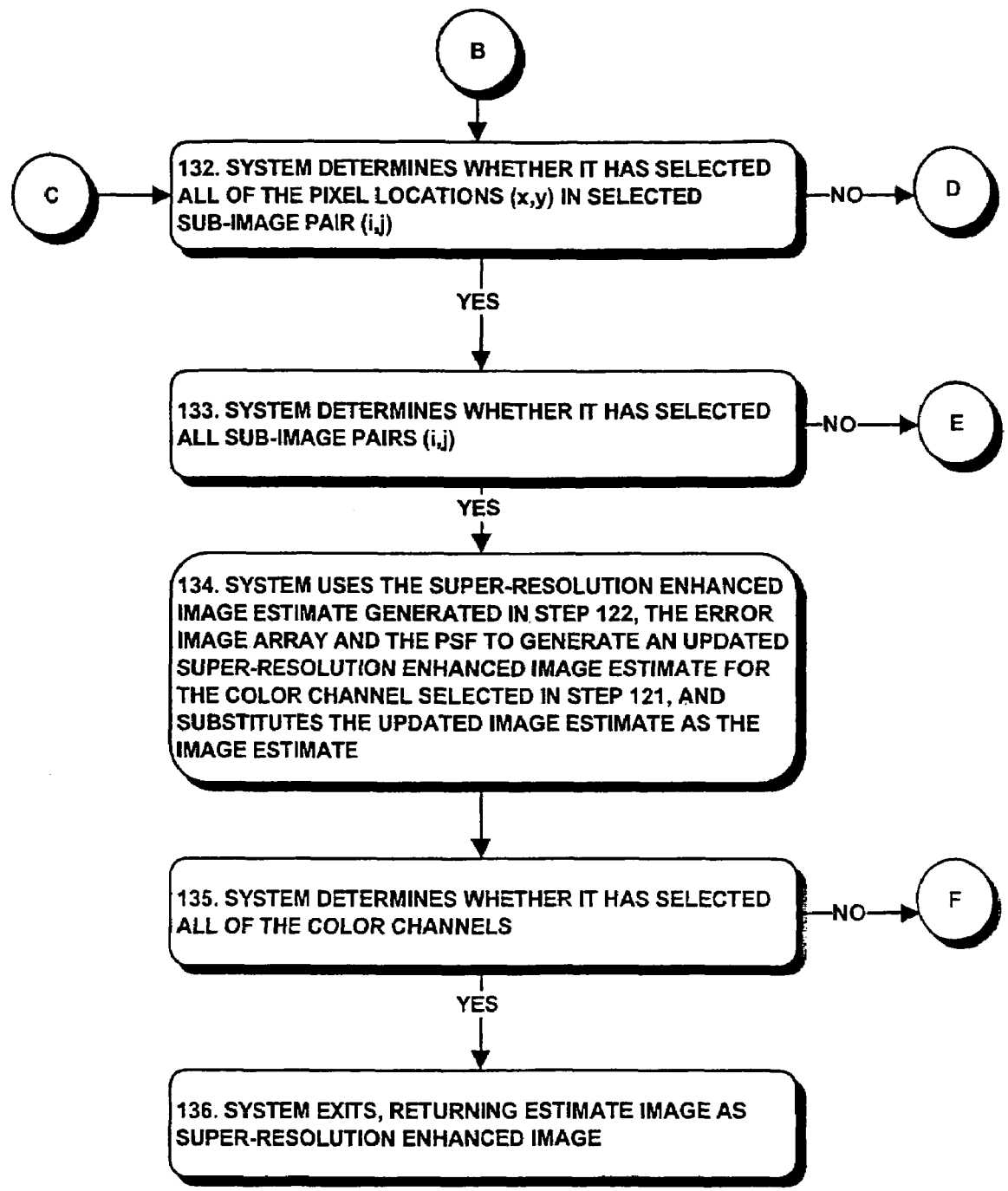

FIG. 3 depicts a flow chart outlining operations that are performed by the super-resolution enhanced image generating arrangement as described above in connection with performing a demosaicing operation. The operations will be apparent to those skilled in the art with reference to the above discussion, and so the various steps outlined in the flow chart will not be described in detail herein.

The invention provides a number of advantages. In particular, the invention provides a system that generates a super-resolution enhanced image of a scene from a plurality of input images of the scene, which input images may have been recorded using two or more different image recording sensors. The system may be used for a number of applications, including but not limited to the demosaicing application described herein;

It will be appreciated that a number of changes and modifications may be made to the super-resolution enhanced image generating system as described above. For example, the super-resolution enhanced image generating system can be used in connection with a demosaicing operation to generate demosaiced images that were provided using image recording sensors for different colors than those described above, or that are sensitive to different parts of the electromagnetic spectrum. In addition, the super-resolution enhanced image generating system can be used in connection with a demosaicing operation to generate demosaiced images that were provided using image recording sensors having different patterns of light sensing elements.

In addition, although the projected image $p_i=B_i(W_i(f))\downarrow$ may be generated using the warping operator $W_i$, followed by the blurring operator $B_i$, it will be appreciated that the projected image $p_i$ may be generated using the blurring operator $B_i$ followed by the warping operator $W_i$, or by selected one or more of the respective warping, blurring and/or decimation operators.

Furthermore, although a methodology has been described for generating the initial estimate $\hat{f}$ for the super-resolution enhanced image, it will be appreciated that any of a number of other methodologies may be used.

In addition, although the demosaicing operation has been described in connection with a CCD sensor array, it will be appreciated that the operation can be performed in connection with any sensor arrays, including but not limited to a CMOS array.

Furthermore, although the super-resolution enhanced image generating system has been described as generating a super-resolution enhanced image in the case in which the relation among the intensities of the various input images is affine, it will be appreciated that similar operations can be performed if the intensities have other relations, including but not limited to logarithmic, trigonometric, and so forth, with an appropriate adaptation of the normalized cross-correlation as a measure of fit.

It will be appreciated that a system in accordance with the invention can be constructed in whole or in part from special purpose hardware or a general purpose computer system, or any combination thereof. any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. An image generating system for generating a virtual image from at least first and second images of a scene generated from different respective first and second sensors each being sensitive to a different optical characteristic, the system comprising:
   a pixel transformation module configured to process respective groups of pixels in corresponding locations in the first and second images for determining a transformation between values of a group of pixels the first image and values of a corresponding group of pixels the second image;
   a virtual image module for generating a pixel value in said virtual image from the first image by applying said transformation to a pixel value in the first image so that the pixel values in said virtual image appear as though they were generated from a sensor of similar optical characteristic to the second sensor; and
   a super-resolution enhanced image update generator for using said virtual image in order to enhance the second image.

2. The system according to claim 1, wherein said transformation is a linear transformation of values of pixels in said groups.

3. The system according to claim 1, wherein the optical characteristic is color.

4. A super-resolution enhanced image generating system for generating a super-resolution-enhanced image from at least first and second images of a scene generated from different respective first and second sensors each being sensitive to a different optical characteristic, the system comprising:

A. an initial super-resolution enhanced image generator module configured to use the first image to generate a super-resolution enhanced image estimate;

B. an image projector module configured to selectively use a warping, a blurring and/or a decimation operator associated with the second image to generate from the super-resolution enhanced image estimate a projected super-resolution enhanced image estimate p;

C. an image generating system according to claim 1 configured to use the second image and p to create a virtual image; and D. a super-resolution enhanced image estimate update generator module configured to use the projected super-resolution enhanced image estimate p and the virtual image to generate an updated super-resolution enhanced image estimate.

5. The super-resolution enhanced image generating system according to claim 4, the system being configured to generate the super-resolution enhanced image in relation to a plurality of other images identified as images $\{g_i\}_{i=1}^n$, the system further comprising an image selector module configured to select one of the images $\{g_i\}_{i=1}^n$, the image projector module being configured to selectively use the warping, a blurring and/or a decimation operator associated with the image $g_i$, selected by the image selector module to generate a projected super-resolution enhanced image estimate, the super-resolution enhanced image estimate update generator module being configured to use the selected input image $g_i$ and the super-resolution enhanced image estimate to generate an updated super-resolution enhanced image.

6. The super-resolution enhanced image generating system according to claim 5, further comprising a control module configured to control the image selector module, image projector module, and the super-resolution enhanced image update generator to operate in successive iterations using respective ones of the images $\{g_i\}_{i=1}^n$, in each iteration, the image projector module using the updated super-resolution enhanced image generated during the previous iteration as the super-resolution enhanced image estimate for the respective iteration.

7. A computer implemented method for image enhancement, said method comprising:

processing respective groups of pixels in corresponding locations in at least first and second images of a scene generated from different respective first and second sensors, being sensitive to a different optical characteristic for determining a transformation between values of a group of pixels the first input image and values of a corresponding group of pixels in the second input image;

generating at least one virtual image from the first image by applying said transformation to a pixel value in the first image so that the pixel values in said virtual image appear as though they were generated from a sensor of similar optical characteristic to the second sensor; and using said virtual image in order to enhance the second image.

8. The method according to claim 7, further including:

estimating a validity of each pixel value in the virtual image, and using for image enhancement only pixel values in the virtual image that are considered valid.

9. The method according to claim 7, when used to increase image resolution of the second image.

10. The method according to claim 7, wherein the optical characteristic is color.

11. A computer implemented method for enhancing an image captured by a color camera sensor, said sensor composed of at least two different single-color detectors, having only one single-color detector per pixel, the method comprising:

treating groups of pixels from similar single-color detectors as individual single-color images;

using the method of claim 4 to increase respective resolutions of said single color images; and combining the increased resolution single color images to create an image having multiple color channels for at least one pixel.

12. A computer-implemented method for generating a virtual image from at least first and second images of a scene generated from different respective first and second sensors each being sensitive to a different optical characteristic, the method comprising:

processing respective groups of pixels in corresponding locations in the pair of images for determining a transformation between values of a group of pixels in one of said images and values of a corresponding group of pixels in a second one of said images;

generating a pixel value in said virtual image from a first one of said images by applying said transformation to a pixel value in the first image so that the pixel values appear as though they were generated from a sensor of similar optical characteristic to the second sensor; and using the virtual image in combination with a second one of said pair of images to create an enhanced image.

13. The method according to claim 12, wherein generating a pixel value in the virtual image includes applying a linear transformation of values of corresponding pixels in said groups.

14. The method according to claim 12, further including:

estimating a validity of each pixel value in the virtual image, and using for image enhancement only pixel values in the virtual image that are considered valid.

15. The method according to claim 12, wherein the enhanced image is of higher resolution than said second one of said pair of images.

16. The method according to claim 12, wherein the optical characteristic is color.

17. A computer implemented method for enhancing an image captured by a color camera sensor, said sensor composed of at least two different single-color detectors, and having only one single-color detector per pixel, the method comprising:

treating groups of pixels from similar single-color detectors as individual single-color images;

using the method of claim 12 to increase respective resolutions of said single color images;

combining the increased resolution single color images to create an image having several color channels for at least one pixel.

18. A computer-implemented program storage device readable by machine, tangibly embodying a program of instructions executable by the machine to perform a method for generating a virtual image from at least first and second images of a scene generated from different respective first and second sensors each being sensitive to a different optical characteristic, the method comprising:

processing respective groups of pixels in corresponding locations in the first and second images for determining a transformation between values of a group of pixels the first image and values of a corresponding group of pixels the second image;

generating a pixel value in said virtual image from the first image by applying said transformation to a pixel value in the first image so that the pixel values in said virtual image appear as though they were generated from a sensor of similar optical characteristic to the second sensor; and using the virtual image to create an enhanced image.

* * * * *